United States Patent [19]

Walker, Jr.

[11] 4,057,874
[45] Nov. 15, 1977

[54] FOOD PATTIE MOLDING TOOL

[76] Inventor: Fred T. Walker, Jr., Box 146, Babcock, Wis. 54413

[21] Appl. No.: 670,677

[22] Filed: Mar. 26, 1976

[51] Int. Cl.² .................................................. A22C 7/00
[52] U.S. Cl. ......................................... 17/32; 99/450.8
[58] Field of Search ................... 17/32.45; 99/450.8; 425/236, 440; 44/11, 12, 13

[56] References Cited

U.S. PATENT DOCUMENTS

| 1,749,178 | 3/1930 | Berg | 17/32 |
| 2,817,200 | 12/1957 | Garfunkel | 17/32 X |
| 2,837,761 | 6/1958 | Stiegler | 17/32 |
| 2,994,286 | 8/1961 | Mussari, Jr. | 17/32 X |
| 3,008,235 | 11/1961 | Royer et al. | 17/32 X |
| 3,120,678 | 2/1964 | Glenny | 17/32 |
| 3,913,175 | 10/1975 | Peterson | 17/32 |

Primary Examiner—Louis G. Mancene
Assistant Examiner—Paul J. Hirsch

[57] ABSTRACT

Disclosed is a tool for molding food patties in the form of a cylinder having an open bottom. A piston slidably disposed within the cylinder has a pushrod projecting upwardly out of the cylinder and is guided for vertical reciprocating movements. A handle is fastened to the top of the pushrod and resilient means is provided for biasing the handle and the attached piston upwardly. An elastic closure diaphragm is secured across the open bottom of the cylinder to yield and deform into engagement with the interior surface of the cylinder and the under surface of the piston when the tool is pressed downwardly on a quantity of plastic food to mold the same. The diaphragm returns to its original shape to automatically eject the molded pattie when the tool is lifted.

6 Claims, 4 Drawing Figures

U.S. Patent  Nov. 15, 1977  4,057,874
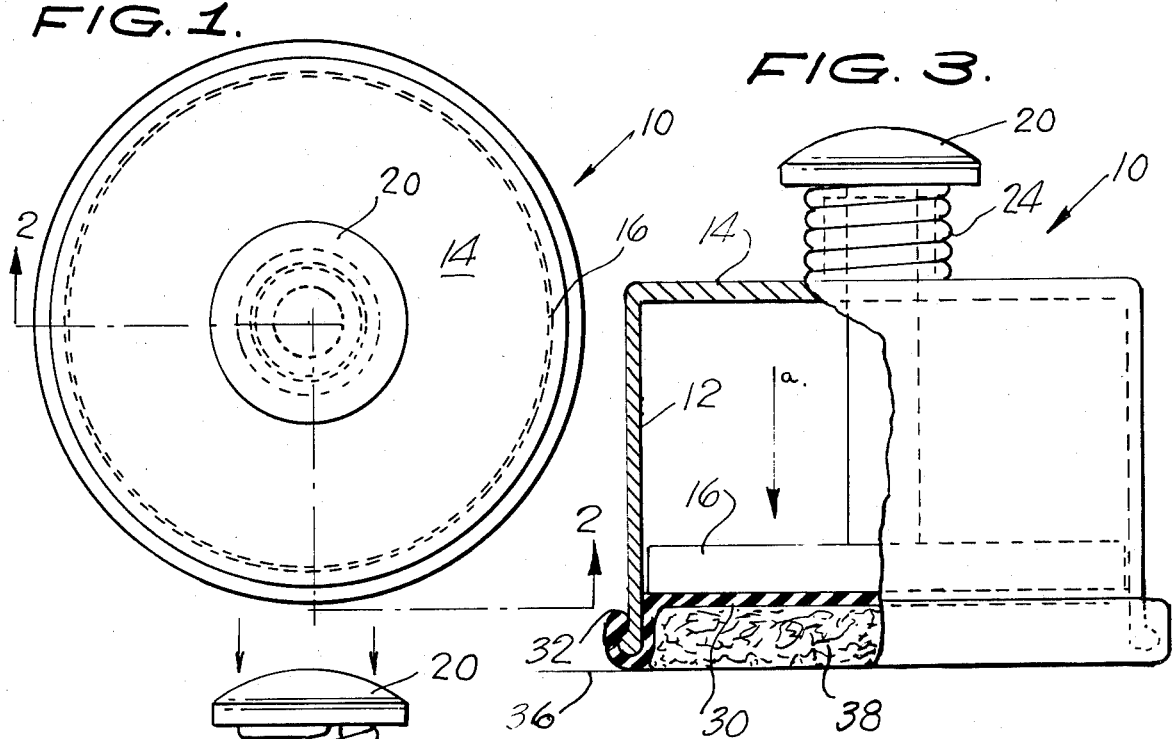
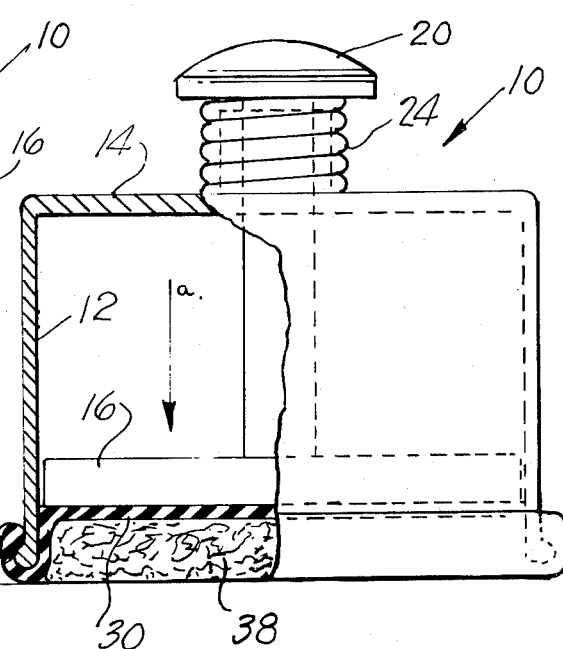
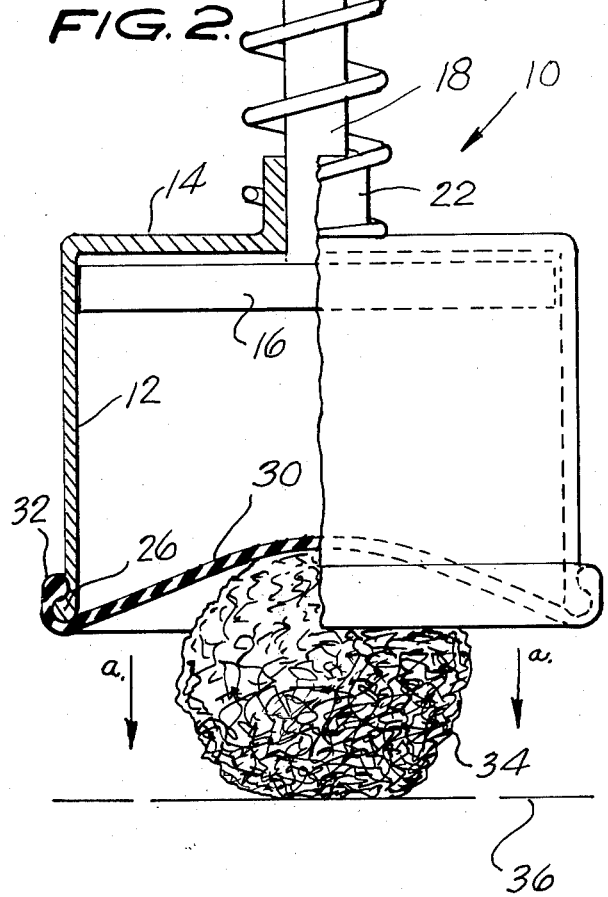
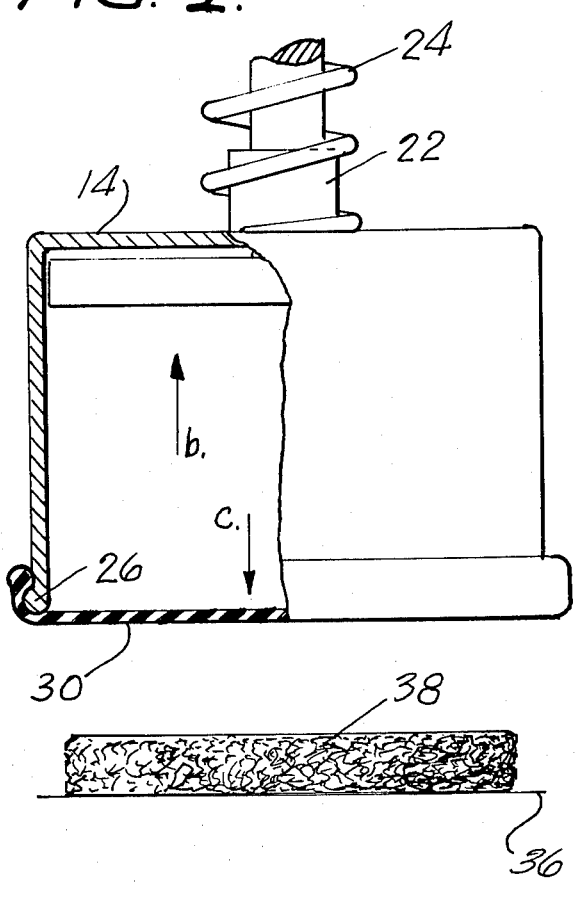

4,057,874

FOOD PATTIE MOLDING TOOL

FIELD OF THE INVENTION

This invention pertains to a tool for preparing foodstuff and, more particularly, to an appliance for forming patties and the like.

Many foods are prepared in the form of patties. Typical of such foods are ground meat and fish, which are served as hamburgers or fish cakes, and pastries, which are served as cookies or the like. It is very desirable to simply and easily make such patties of uniform size and cross-section, and particularly of uniform cross-section but varying thickness. This cannot be easily done by hand. Accordingly, many types of molds or pattie formers have been proposed. The earliest ones were of the cookie-cutter type which required rolling out the ingredients into sheets. Later and more advanced formers provided molds, of fixed volume, which required careful measuring of the starting mass of plastic food because otherwise the mold would not completely fill, resulting in a non-uniform pattie. Still more advanced pattie formers have been proposed, but these usually are of complex construction, difficult to clean, and either lack means for separating and ejecting the molded pattie from the mold structure or utilize disadvantageous ejecting means such as rotating knives, wire nettings to prevent suction between the pattie and the mold, and similar impractical structures.

SUMMARY OF THE INVENTION

It is therefore a general object of the invention to provide an improved tool for forming food patties which will overcome the disadvantages of conventional tools as briefly outlined above.

It is another object of the invention to provide an improved food tool for forming patties quickly, easily and uniformly.

It is a further object of the invention to provide a pattie mold which always forms a preselected amount of food material into a pattie of desired shape, cross-section, and thickness, but with which the thickness of the pattie is varied by changing the amount of material to be formed.

It is yet another object of the invention to provide a pattie molding tool, having the above described characteristics and objects, which is easy to operate, simple in construction and inexpensive to fabricate.

It is yet a further object of the invention to provide a food pattie molding tool which is easy to clean and sanitary in use, said tool including an elastic diaphragm which prevents the collection of food inside the forming cylinder.

It is a still further and important object of the invention to provide a food pattie molding tool, having the above described characteristics, which automatically ejects the formed pattie from the mouth of the cylinder.

Still another object of the invention is to provide an improved pattie molding tool, having the above described characteristics and including the above mentioned elastic diaphragm, in which the diaphragm is self-clamped in place and is releasable for replacement by another diaphragm after continuous use and resulting wear.

Briefly, the invention contemplates a pattie forming tool which comprises a cylinder having a top closure and open at the bottom. A piston is slidably disposed for reciprocating movements within the cylinder and has a pushrod projecting upwardly and out through a central opening in the top closure of the cylinder. A handle is fastened to the top of the pushrod and resilient means is disposed between the handle and the top closure biasing the handle and the attached piston upwardly. An elastic diaphragm covers the open bottom of and is secured to said cylinder. The diaphragm deformably yields into engagement with the interior surface of the cylinder and the under surface of the piston when the tool is pressed downwardly on a selected quantity of plastic food to mold the same into the pattie. The diaphragm returns to its original shape to automatically eject the molded pattie when the tool is lifted.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several Figures, and in which:

FIG. 1 is a plan view of a pattie forming tool constructed in accordance with the invention;

FIG. 2 is an elevational view partly in section, taken along line 2—2 of FIG. 1 and looking the direction of the arrows, and showing a quantity of food about to be formed, or molded;

FIG. 3 is an elevational view similar to FIG. 2, but showing a food pattie formed within the tool; and FIG. 4 is a fragmentary view similar to FIGS. 2 and 3, but showing the tool lifted from the work surface and the formed pattie ejected from the tool.

DESCRIPTION OF THE PREFERRED EMBODIMENT

Referring now more particularly to the drawings, a food pattie molding tool according to the invention is designated by the numeral 10, and comprises an upright cylinder 12 open at the bottom and preferably, but not necessarily, closed at the top 14. Slidably received within the cylinder for vertical reciprocating movements, is a closely fitting piston 16. The piston is fixed at its center to an upwardly and outwardly projecting pushrod 18 and which is capped by a handle 20 secured to the upper end of the rod. The cylinder closure 14 has a central opening surrounded by an upstanding bearing collar 22 which guides the pushrod in its vertical reciprocating movements. A compression coil spring 24 is disposed between the cylinder top closure 14 and the underside of the handle 20 biasing the handle 20 upwardly so that under normal conditions the handle, pushrod and piston are elevated to their uppermost positions as illustrated in FIG. 2.

The bottom edge of the cylinder 12 is formed with an outwardly protruding, circumferential bead 26 and, for closing the open bottom of the cylinder, a thin elastic diaphragm 30, in the shape of a disc having a circumferential bead 32, is stretched over the opening and released so that the bead 32 clampingly but releasably locks over the cylinder bead 26. Thus, under normal conditions, the elastic diaphragm 30 is stretched horizontally over the bottom opening of cylinder 12, as illustrated in FIG. 4.

In use of the pattie molding tool, a preselected quantity of ground hamburger meat, or other plastic foodstuff, in the shape of a lump, or ball, 34 is placed on a clean, hard, work surface 36. The tool 10 is placed over the food ball 34, as shown in FIG. 2, and the handle 20 is pressed downwardly causing the piston 16 to move downwardly in cylinder 12, compressing spring 24 and flexing the diaphragm 30 upwardly to meet the piston 16, whereupon the cylinder 12 moves down in the direction of the arrows a,a onto the surface 36. During the latter part of this movement, the elastic diaphragm 30 is stretched and distorted upwardly into the cylinder to contact the inner surface thereof and the under surface of the piston 16, while the food ball 34 is spread and compressed by the piston 16 into a disc-like pattie 38, as shown in FIG. 3. Downward pressure on the handle 20 is then released, allowing the piston 16 to rise in the cylinder to its initial position under force of the spring 24 (arrow b), and releasing the downward pressure on cylinder 12 tending to hold the same against the surface 36. The tool may then be lifted from surface 36, as shown in FIG. 4, which allows the elastic diaphragm 30 to return to its horizontal position (arrow c), automatically ejecting the formed pattie 38 from the cylinder of the tool.

The above steps may be repeated for forming any desired number of patties which will all be of uniform size, shape and cross-section provided that the quantity of food material utilized in the ball 34 is preselected to be the same for each of the balls. The thickness of the pattie 38 depends upon this preselected quantity of food material. Since the cylinder 12 is of greater height than the pattie 38, patties of greater thickness may obviously be formed by preselecting larger quantities of foodstuffs to be molded in the cylinder, the diaphragm 30 expanding to greater degree and the piston 16 moving downward a lesser distance with increased quantities of foodstuff being molded. Thus it will be apparent that patties of varying thickness may easily be formed in a simple manner without the need to adjust or add parts to the tool for changing the thickness of the molding cavity or travel of the molding piston.

The formed pattie or patties can be used immediately for grilling, or cooking, or may be stacked with separators of waxed paper, or Saran, for cold storage, or freezing, and later use. Obviously, a wax paper separator may be placed under and above the food ball 34 before it is molded in the tool so that when it is molded and ejected the pattie will simultaneously be covered by protective separators.

The cylinder 12, its closure 14, piston 16, rod 18 and handle 20 may all be made of metal, or plastic. The diaphragm 30 is preferably formed of a non-absorbent elastomer, suitable for contact with food without contaminating the same, such as natural rubber. A synthetic polymer having similar characteristics may also be used, for example, an acrylontrile-butadiene copolymer, a chloroprene polymer, polybutadiene, polyisoprene, a silicone elastomer containing methyl groups, or a styrene-butadiene copolymer.

It is apparent that the stretchable diaphragm 30 covering the opening of the cylinder, and its distortion into engagement with the internal surface of the cylinder and the underside of the piston, prevent unwanted deposit of the foodstuff within the tool cylinder. This renders the tool clean and sanitary during and after use since particles of the foodstuff cannot collect in, remain and contaminate the interior. It is relatively easy to wipe off the bottom surface of diaphragm 30 after use to maintain the said surface in clean condition. After extensive use of the tool and possible wear, or tear, of the diaphragm, a new diaphragm may be substituted by unrolling bead 32 from engagement with the cylinder bead 26 to release the old diaphragm, and a new diaphragm may then be quickly stretched and clamped into place in the manner previously described.

While the diaphragm 30 has been described as clamped to the cylinder 12 by its inherent resiliency, it may be affixed in other ways, as by a clamping ring, cementing or gluing.

The cylinder 12 has been described as being cylindrical and illustrated as being of circular right section, but it need not be so as obviously cylinders of square, triangular and other shaped cross-sections may be utilized to vary the configuration of the pattie.

Although a certain specific embodiment of the invention has been shown and described, it is obvious that many modifications thereof are possible. The invention, therefore, is not intended to be restricted to the exact showing of the drawings and description thereof, but is considered to include reasonable and obvious equivalents.

What is claimed is:

1. A household, manually operable food pattie molding tool comprising, a cylinder having an open bottom, a piston slidably disposed for reciprocating movements within the cylinder and having a pushrod projecting upwardly out of the cylinder, means for guiding reciprocating movements of the pushrod, a manually operated handle fastened to the top of said pushrod, resilient means biasing the piston upwardly, and resilient diaphragm means covering the open bottom and secured to said cylinder but not to said piston or pushrod for deformably yielding upwardly into engagement with the interior surface of the cylinder and the under surface of the piston when the diaphragm, tool and piston are pressed downwardly on a quantity of plastic food to mold the same and for returning downwardly to it original shape to serve as the sole means for automatically ejecting the molded pattie when the tool is lifted.

2. A food pattie molding tool according to claim 1, wherein said diaphragm is formed of natural rubber.

3. A food pattie molding tool according to claim 1, wherein said diaphragm is formed of a synthetic polymer.

4. A food pattie molding tool according to claim 1, wherein said diaphragm has a bead along its periphery, the bottom edge of the cylinder being provided with a similar bead, said diaphragm being stretched over the open bottom of the cylinder with said beads in releasable clamped engagement.

5. A food pattie molding tool according to claim 1, wherein said cylinder has a top closure, said means for guiding reciprocating movements of the pushrod including an opening in said closure through which the pushrod passes.

6. A food pattie molding according to claim 5, wherein said resilient means comprises a compression coil spring disposed between said top closure and said handle affixed to the top of the pushrod.

* * * * *